Patented Mar. 4, 1930

1,749,501

UNITED STATES PATENT OFFICE

HEINRICH NERESHEIMER AND WILHELM SCHNEIDER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS

No Drawing. Application filed November 9, 1927, Serial No. 232,188, and in Germany November 15, 1926.

Red vat dyestuffs are already known, derived from 1-acylamino-4-hydroxyanthraquinones by the substitution of the hydroxyl group with the radicles of monovalent alcohols. As a rule these products dye cotton only from cold vats.

We have now found that vat dyestuffs which will dye from warm vats also, and give much more yellowish shades are obtained by introducing radicles of polyvalent alcohols into the hydroxyl group or groups of 1-acylamino-4-hydroxy-anthraquinones. These vat dyestuffs may be prepared for example, by treating the 1-acylamino-4-hydroxyanthraquinones with suitable esters, such as the halogen hydrid esters or aryl-sulfonic esters of polyvalent alcohols, in the presence of substances capable of combining with acids. Depending on the conditions of working the acid radicles of the esters used may be completely, or only partially replaced by 1-acylamino-4-hydroxyanthraquinone radicles. In the case of a partial replacement, hydroxyl groups may in some instances be substituted, by a secondary reaction, for the unexchanged acid radicles.

The resulting vat dyestuffs give bright orange dyeings, with excellent properties as regards fastness, on vegetable fibres, from both cold and warm vats.

The following examples will further illustrate how the said invention may be carried into practical effect but the invention is not limited thereto. The parts are by weight.

Example 1

10 parts of 1-benzoylamino-4-hydroxyanthraquinone are boiled with 10 parts of p-toluenesulfonic acid chlorethyl ester and 10 parts of calcined soda in 100 parts of trichlorbenzene, until benzoylamino-hydroxy-anthraquinone can no longer be detected. The resulting dyestuff can be separated into two components by crystallization, for example, from nitrobenzene. The analysis and properties of the more readily soluble component indicate that it probably consists of a mixture of two substances of the following constitution:—

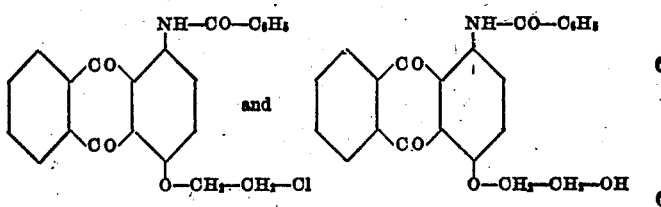

The product gives yellow dyeings with an orange tinge on cotton from a vat of the same color. Boiling with soap develops the color to a brilliant red-orange.

The component which is less readily soluble in nitrobenzene, and has, from analysis, the probable constitution:—

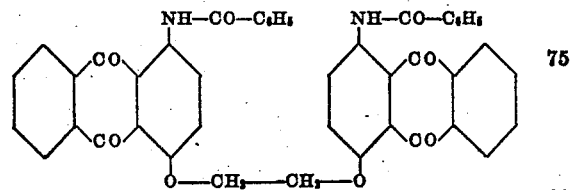

is very similar, in tinctorial properties, to the more soluble product.

Example 2

10 parts of 1-benzoylamino-4-hydroxyanthraquinone, 15 parts of di-p-toluenesulfonic acid ester of ethyleneglycol, 10 parts of calcined soda and 60 parts of trichlorbenzene are treated as described in Example 1. The reaction product is identical, chemically and tinctorially, with the dyestuff which is the less readily soluble in nitrobenzene obtained according to Example 1.

Example 3

If the 1-benzoylamino-4-hydroxyanthraquinone used in Example 2 be replaced by 1-m-methoxybenzoylamino-4-hydroxyanthraquinone, a vat dyestuff is obtained which gives powerful yellow-orange dyeings on vegetable fibres, the color of which is not modified by boiling soap.

*Example 4*

If the di-p-toluenesulfonic acid ester of ethyleneglycol used in Example 2 be replaced by glycerol-tri-p-toluenesulfonic ester, a dyestuff of very similar shade to that obtained according to Example 2 is produced.

What we claim is:

1. The process for the production of orange-colored vat dyestuffs of the anthraquinone series, which consists in acting on a 1-acylamino-4-hydroxy-anthraquinone with an agent capable of supplying a radicle of a polyvalent alcohol.

2. The process for the production of orange-colored vat dyestuffs of the anthraquinone series, which consists in introducing radicles of polyvalent alcohols into the hydroxyl groups of 1-acylamino-4-hydroxy-anthraquinones.

3. The process for the production of orange-colored vat dyestuffs of the anthraquinone series, which consists in treating 1-acylamino-4-hydroxyanthraquinones with esters of polyvalent alcohols containing an easily interchangeable acid residue in the presence of a substance capable of combining with acids.

4. The process for the production of an orange-colored vat dyestuff of the anthraquinone series, which consists in treating 1 - benzoylamino - 4 - hydroxyanthraquinone with the di-p-toluene-sulfonic acid ester of ethylene glycol in the presence of a substance capable of combining with acids.

5. As new articles of manufacture orange vat dyestuffs of the anthraquinone series being probably 1-acylamino-4-hydroxyanthraquinones in which the hydroxyl groups are substituted by radicles of polyvalent alcohols, substantially as described.

6. As new article of manufacture the orange vat dyestuff probably having the constitution:—

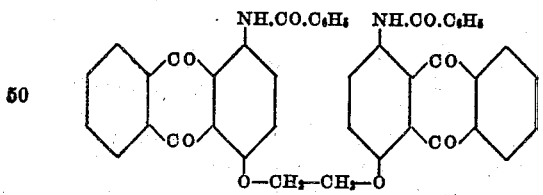

substantially as described.

In testimony whereof we have hereunto set our hands.

HEINRICH NERESHEIMER.
WILHELM SCHNEIDER.